United States Patent
Gruener et al.

(10) Patent No.: US 9,406,426 B2
(45) Date of Patent: Aug. 2, 2016

(54) COIL CARRIER AND ELECTROMAGNETIC ACTUATOR HAVING A COIL CARRIER

(71) Applicant: ETO Magnetic GmbH, Stockach (DE)

(72) Inventors: Maria Gruener, Owingen-Billafingen (DE); Michael Feindler, Stockach (DE); Peter Vincon, Stockach (DE)

(73) Assignee: ETO Magnetic GmbH, Stockach (DE)

( * ) Notice: Subject to any disclaimer, the term of this patent is extended or adjusted under 35 U.S.C. 154(b) by 0 days.

(21) Appl. No.: 14/367,284

(22) PCT Filed: Nov. 14, 2012

(86) PCT No.: PCT/EP2012/072596
§ 371 (c)(1),
(2) Date: Jun. 20, 2014

(87) PCT Pub. No.: WO2013/092012
PCT Pub. Date: Jun. 27, 2013

(65) Prior Publication Data
US 2015/0102877 A1    Apr. 16, 2015

(30) Foreign Application Priority Data
Dec. 22, 2011   (DE) .................. 10 2011 056 853

(51) Int. Cl.
*H01F 3/00* (2006.01)
*H01F 7/121* (2006.01)
(Continued)

(52) U.S. Cl.
CPC .............. *H01F 7/121* (2013.01); *F16K 27/029* (2013.01); *F16K 31/0675* (2013.01); *H01F 3/00* (2013.01); *H01F 5/02* (2013.01); *H01F 7/1607* (2013.01)

(58) Field of Classification Search
CPC ......... H01F 7/1607; H01F 5/02; H01F 7/121; H01F 3/00; F16K 31/0675; F16K 27/029
USPC .......... 335/199, 208, 209, 220, 255, 261, 262
See application file for complete search history.

(56) References Cited

U.S. PATENT DOCUMENTS

| 4,142,169 A * | 2/1979 | Katchka ............... H01F 7/1607 335/243 |
| 4,153,890 A | 5/1979 | Coors |

(Continued)

FOREIGN PATENT DOCUMENTS

| CN | 1071529 A | 4/1993 |
| CN | 2261070 Y | 8/1997 |

(Continued)

*Primary Examiner* — Bernard Rojas
(74) *Attorney, Agent, or Firm* — Bachman & LaPointe, P.C.

(57) ABSTRACT

A coil carrier for an electromagnetic actuator (2), with a winding section (3) for the accommodation of an energizable winding, with an injection molded plastic body (4), with a first yoke disc (8) designed as an annular disc and affixed on a first axial face of the winding section (3), and with an armature guide chamber enclosed by the plastic body (4) for the accommodation of an axially adjustable armature (32), wherein a second yoke disc (16) is provided on an axial face of the winding section (3) that is located opposite to the first axial face, characterized in that the first yoke disc (8) has at least one recess (24) that is open in the radially inwards direction, and in that the first yoke disc (8) is affixed to the plastic body (4) by means of overmolding, such that plastic body material projects radially inwards beyond the recess (24) and forms a guide (12) for the armature (32), and in that the second yoke disc (16) is affixed to the plastic body (4) by means of overmolding.

17 Claims, 4 Drawing Sheets

(51) Int. Cl.
*H01F 5/02* (2006.01)
*H01F 7/16* (2006.01)
*F16K 27/02* (2006.01)
*F16K 31/06* (2006.01)

(56) References Cited

U.S. PATENT DOCUMENTS

| | | | |
|---|---|---|---|
| 4,443,775 A | 4/1984 | Fujitani et al. | |
| 5,424,704 A | 6/1995 | Dolle | |
| 5,663,700 A * | 9/1997 | Spence | H01F 7/088 335/257 |
| 8,477,002 B2 | 7/2013 | Hoppe et al. | |
| 2003/0006872 A1 | 1/2003 | Basu et al. | |
| 2006/0049701 A1 | 3/2006 | Sato | |
| 2007/0035373 A1 * | 2/2007 | Henry | B29C 45/14311 336/198 |
| 2013/0264506 A1 | 10/2013 | Schnelker et al. | |
| 2014/0333398 A1 * | 11/2014 | Nila | H01F 7/127 335/281 |
| 2015/0213935 A1 * | 7/2015 | Wernau | H01F 7/16 335/279 |

FOREIGN PATENT DOCUMENTS

| | | |
|---|---|---|
| CN | 1747079 A | 3/2006 |
| CN | 2929922 Y | 8/2007 |
| DE | 69417630 T2 | 11/1999 |
| DE | 102010009400 A1 | 9/2011 |
| DE | 102010055035 A1 | 6/2012 |

* cited by examiner

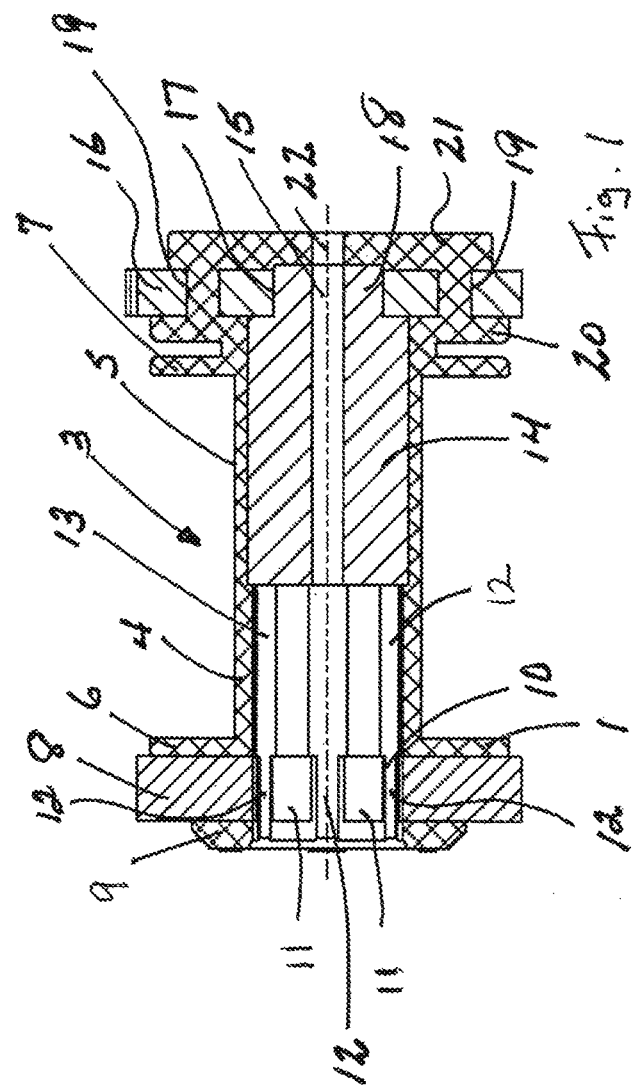

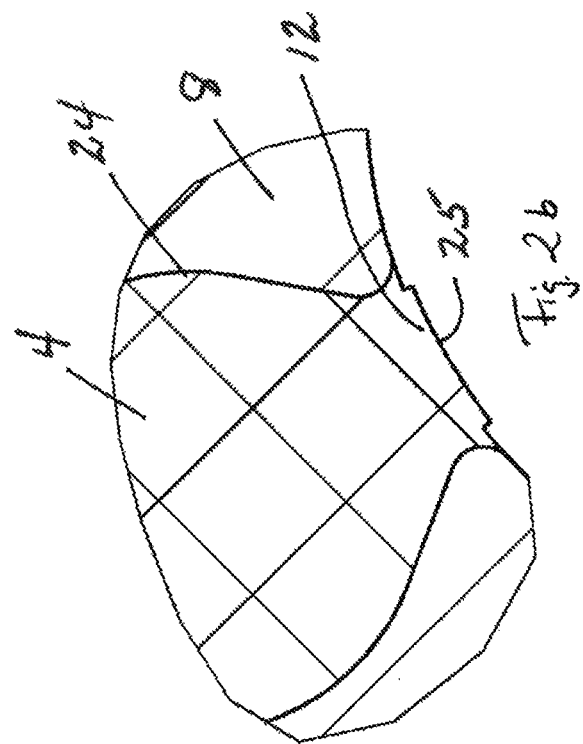
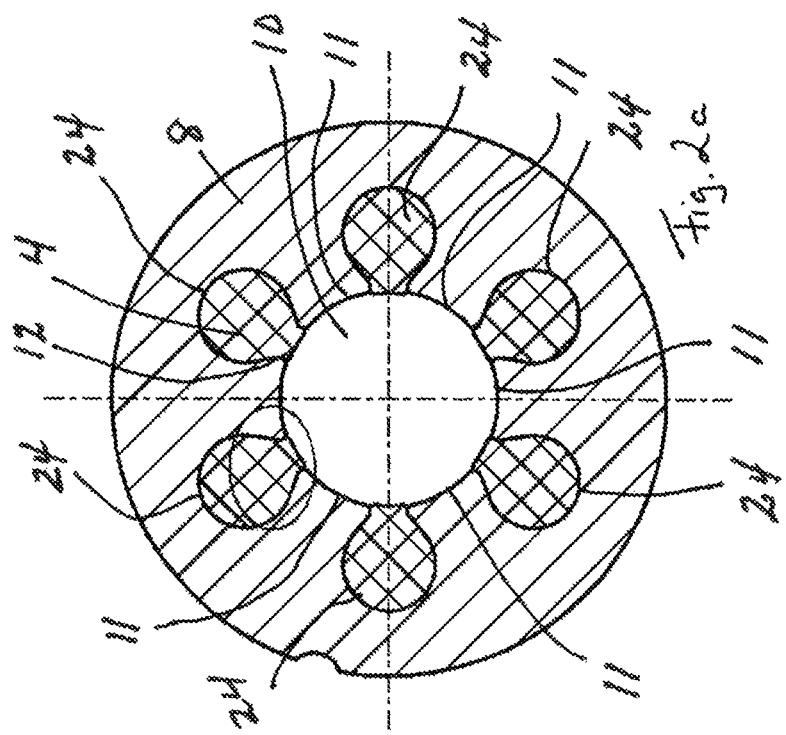

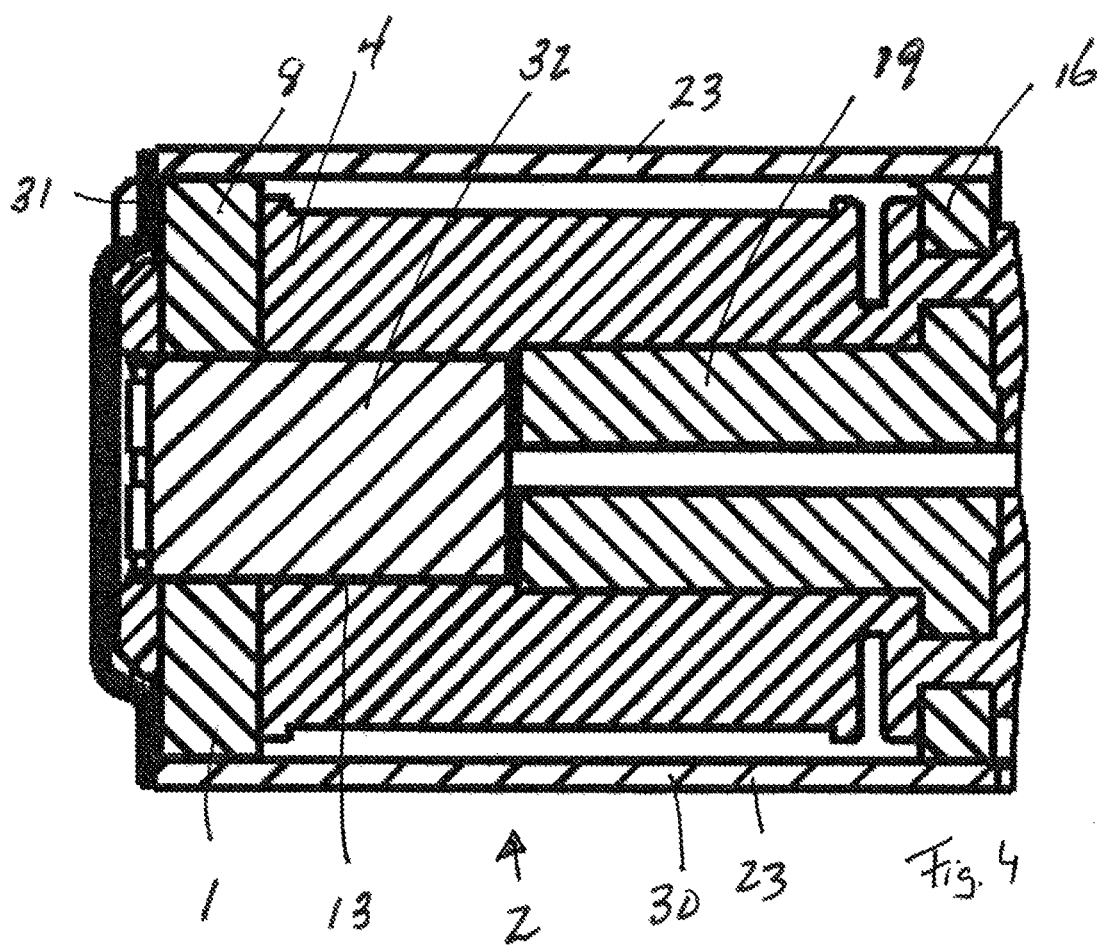

COIL CARRIER AND ELECTROMAGNETIC ACTUATOR HAVING A COIL CARRIER

BACKGROUND OF THE INVENTION

The invention concerns a coil carrier for an electromagnetic actuator, with a winding section for the accommodation of an energisable winding, with an injection moulded plastic body, with a first yoke disc designed as an annular disc and affixed on a first axial face of the winding section, and with an armature guide chamber enclosed by the plastic body for the accommodation of an axially adjustable armature. The invention furthermore concerns an electromagnetic actuator with such a coil carrier.

Coil carriers with a plastic body are of known art, in which is accommodated a metallic armature guide tube for purposes of guiding the armature in its axial adjustment. In such electromagnetic actuators a first yoke disc is positioned on a plane face and affixed during the housing assembly. In this procedure assembly tolerances are problematical. In practice it is only possible with difficulty to install the metallic armature guide tube with a sufficiently small axis misalignment over the tolerance range of all components, as a result of which both mechanical and magnetic disturbing forces can occur in the radial direction, as a result of which increased friction ensues in the mounting, which can lead to premature wear. Moreover a comparatively large radial distance ensues between the adjacent magnetic functional components and the armature, wherein this distance is detrimental to the magnetic force and consequently to the system performance and the efficiency.

In the case of geometrically comparatively large electromagnetic actuators coil carriers are deployed in which the armature is guided not in an armature guide tube, but directly on plastic elevations arranged side-by-side in the peripheral direction and extending in the axial direction. In such electromagnetic actuators the assembly of the first yoke disc takes place by positioning it on a plurality of axial extensions of the plastic body spaced apart from one another in the peripheral direction; these are guided through corresponding passage recesses in the first yoke disc spaced apart from one another in the peripheral direction. The affixing of the yoke disc takes place during the housing assembly. The aforesaid technology has proved itself for the aforementioned, comparatively large actuators with large volume coil carriers, in which the axial extensions have a sufficiently large material strength. The deployment of this technology is problematical in more delicate electromagnetic actuators that operate with comparatively small coil carriers, which do not allow the provision of axial extensions of sufficiently strong material for purposes of positioning the first yoke disc. This can result in various disturbances during assembly and a high scrap rate, since the axial extensions can break during the positioning of the yoke disc. Moreover in the aforesaid technology the radial distance between yoke disc and armature is sometimes still too large and still too afflicted by tolerances; this has a negative effect on the efficiency, which in the case of small magnetic actuators is particularly problematical, since it is not possible to deploy coil windings of any size.

Often in the coil carriers of known art an axial bending up of the plastic walls axially bounding the winding section occurs, since in the prior art winding takes place before the assembly of the yoke disc and the plastic walls axially bounding the winding section have low stability.

From the later published DE 10 2010 055 035 A1 an electromagnetic valve is of known art, in which just one yoke disc is affixed by overmoulding onto the plastic body forming an armature guide chamber.

DE 10 2010 009 400 A1 shows an electromagnetic hydraulic valve in which a multi-part yoke disc is provided, which after the injection moulding process for the manufacture of a plastic body is inserted into corresponding plastic body recesses.

From DE 93 00 039 U1 an electromagnetic actuator is of known art, in which a yoke disc is affixed by means of axial clamping.

From DE 694 17 630 T2 an electromagnetic valve is of known art, which has a tubular metallic core.

SUMMARY OF THE INVENTION

Based on the above-cited prior art, the object underlying the invention is that of specifying an alternative coil carrier which on the one hand ensures ease of assembly of the electromagnetic actuator, and which, moreover, is distinguished by minimal tolerances and distances between components that are relevant to the magnetic circuit and the armature. Moreover the coil carrier should be particularly robust and suitable for deployment in geometrically small actuators.

Furthermore the object comprises the specification of, in particular, a small electromagnetic actuator with a correspondingly improved coil carrier.

With regard to the coil carrier this object is achieved with the features disclosed herein, and with regard to the electromagnetic actuator with the features disclosed herein. Advantageous further developments of the invention are also specified. All combinations of at least two of the features disclosed in the description, the claims, and/or the figures fall within the framework of the invention.

The concept underlying the invention is that of replacing the mechanical positioning of the first yoke disc on axial extensions by an overmoulding of the yoke disc, that is to say, an affixing of the yoke disc, at the earlier stage of manufacture of the plastic body, wherein the annular first yoke disc, i.e. having a central passage, is created such that this has at least one recess that is open in the radially inwards direction, which during the plastic injection moulding process is filled with plastic body material, and in particular such that the plastic body material projects radially inwards into the central passage of the yoke disc and thus forms a guide for the armature in its axial adjustment. In other words, guiding surfaces are formed, i.e. provided, from plastic body material for the guidance of the armature, which material projects radially inwards beyond at least one recess, preferably a plurality of recesses, in the magnetically conducting yoke disc that are open in the radially inwards direction and spaced apart in the peripheral direction. In the inventive coil carrier the separate assembly of the first yoke disc on the finished plastic carrier is omitted, since the first yoke disc, preferably in one piece, is affixed to the plastic body in a form fit during the manufacture of the plastic body. Moreover the radial distance of the yoke disc to the armature can be dimensioned, i.e. set, very accurately via the setting of the radial inner projection of the plastic body material beyond the yoke disc, and can be optimised in the interests of a good efficiency. As a result of the integration of the yoke disc into the plastic body by overmoulding the former component becomes more stable, in particular for a downstream winding process. Bending up phenomena, such as occur in the prior art, are reliably avoided. Moreover during the assembly there is no risk of damage to the components, even in the case of small coil carriers, as a result of which the inventive coil carrier in particular (although not exclusively) is suitable for deployment in small electromagnetic actuators. In particular, if the armature is guided directly on plastic body material, not only in the region radially within the yoke disc, but also in an axially adjacent region within the armature guide chamber, further advantages ensue. Thus the installation space becomes superfluous, as does the assembly clearance maintained for an additional mounting element, in the prior art designed as an armature guide tube; as a result the parasitic air gap in the region of the armature can be embodied in an altogether smaller manner. Moreover a sufficiently small axis misalignment is possible over the tolerance range of all components, which in turn leads to lower mechanical and magnetic disturbing forces in the radial direction. A further important advantage of the inventive coil carrier consists, moreover, in the reduction of the number of individual parts; thus as mentioned no armature guide sleeve is required and the, preferably metallic, first yoke disc no longer forms an individual part, as in the prior art. Assembly is significantly simplified, since a positioning process that is subject to disturbances can be omitted, as can a subsequently following additional affixing process within the framework of the assembly of the housing.

In accordance with the invention provision is further made for the provision, in addition to the first yoke disc, of a second yoke disc, preferably in one piece, located opposite to the first yoke disc with respect to the winding section located between them; the second yoke disc is also affixed by overmoulding onto the plastic body, so that a separate assembly is avoided. The second yoke disc preferably makes contact with, i.e. fits closely onto, a magnetically conducting core, likewise provided in the plastic body and overmoulded, which bounds the armature guide chamber in the axial direction, wherein it is further preferable if the core has an axial passage for purposes of accommodating a plunger that can be adjusted by means of the armature, which in turn preferably works together with a positioning partner, in particular a valve body, preferably a sphere, in particular of an oil valve.

The inventive coil carrier is therefore distinguished in that it has a first and a second yoke disc, both of which are affixed to the plastic body by means of overmoulding using the plastic material forming the plastic body during the manufacture of the plastic body with the injection moulding method. The provision of the second yoke disc, in accordance with the invention likewise affixed by overmoulding on the plastic body, as in the case of the first disc, ensures that the coil carrier is further stabilised and bending up phenomena during the downstream winding process are reliably avoided.

As has already been mentioned in the introduction, it is particularly preferably if a plurality of recesses are provided in the yoke disc that are each open in the radially inwards direction, and are, in particular, evenly spaced apart in the peripheral direction; by means of overmoulding with plastic body material these are filled such that the plastic body material projects radially inwards beyond the recess, i.e. beyond the first yoke disc, so as to form a guide for the armature. Here it is particularly expedient if this guide continues in the axial direction beyond the axial extent of the first yoke disc into the armature guide chamber, preferably over the whole of the latter's axial extent. In this manner a segmented plastic guide is provided for the armature that is less afflicted by tolerances. Here it is particularly expedient if the guiding surface formed from the above plastic body material is matched to the outer surface shape of the armature. Matching preferably takes place onto a cylindrical armature, so that the guiding surfaces are curved in a concave manner.

Ideally a plastic wall section of the plastic body is provided on both axial faces of the yoke disc, so that the first yoke disc is accommodated in a kind of peripheral groove, wherein the groove walls (wall sections) project radially outwards beyond the inner periphery of the central passage bounded by the first yoke disc so as thus to secure the first yoke disc in the axial direction. In other words, a supporting section (wall section, groove wall section) of the coil body is formed both right and left of the yoke disc; these supporting sections accommodate the yoke disc between them with zero clearance, wherein the supporting sections are connected with one another in the axial direction, i.e. are integrally formed via the plastic body material provided in the at least one recess in the first yoke disc that is open in the radially inwards direction.

In order to minimise further the radial distance between the yoke disc formed from a magnetically conducting material, in particular soft iron, and the armature, provision is advantageously made in a further development of the invention that the first yoke disc is overmoulded such that the first yoke disc, in each of the peripheral sections between two of the guides formed from the plastic body material radially within the recesses that are open in the inwards direction, directly bounds an armature guide chamber, such that on the inner periphery of the yoke disc plastic material is not provided over the whole of the periphery, but rather preferably essentially only in the regions radially within the recesses, so as thus to improve the magnetic efficiency.

The projection of the at least one guide radially inwards beyond the yoke disc is preferably selected from a range of values between 0.01 mm and 0.1 mm. The inventive production technology enables this value to be accurately set by means of appropriate shaping of the injection moulding tool.

As has already been mentioned it is particularly expedient if additional guide elements, such as an armature guide sleeve, are dispensed with and the at least one guide within the first yoke disc continues in the axial direction into the armature guide chamber, so that in a region adjacent to the yoke disc in the armature guide chamber at least one guide is formed, projecting radially inwards, preferably in the form of lines or bands, preferably a plurality of guides evenly spaced apart in the peripheral direction, in other words altogether a guide segmented in the peripheral direction is obtained.

As mentioned in the introduction the coil body designed in accordance with the concept of the invention is suitable for and defined for, although not exclusively, deployment in small applications. The coil body therefore preferably has an axial extent from a range of values between 5 mm and 35 mm, preferably between 15 mm and 25 mm, and/or an internal diameter of the armature guide chamber from a range of values between 5 mm and 20 mm, preferably between 5 mm and 10 mm. It is further preferred if the outer diameter of the first yoke disc is between 10 mm and 30 mm.

With regard to the design of the winding section there are various possibilities. The latter is preferably formed directly on the plastic body and further preferably has a cylindrical section of the plastic body, on which the energisable winding can be wound, in particular is wound.

The invention leads also to an electromagnetic actuator with a coil body carrying an energisable winding, which is designed in accordance with the concept of the invention, in whose armature guide chamber an adjustable armature is accommodated, which is guided on the at least one guide radially within the first yoke and preferably also on at least one guide formed from the plastic body material, preferably in the form of bands, axially adjacent to the yoke in the armature guide chamber. In principle there are very many possible applications for the electromagnetic actuator. The latter is preferably part of a valve device, in particular of an oil valve device, wherein it is further preferred if a plunger passing through the core, integrally designed with the armature, or at least acting together with the armature, acts together with a valve body of the valve device to provide adjustment, wherein the latter, in particular, preferably takes the form of a valve ball.

As required the armature can be adjustable by means of the energisable winding against the force of a restoring spring and/or against the pressure force of a valve body acted upon by fluid pressure, for example, or the restorative adjustment can take place by means of appropriate energisation of the winding.

BRIEF DESCRIPTION OF THE DRAWINGS

Further advantages, features, and details of the invention ensue from the following description of preferred examples of embodiment, and also with the aid of the drawings.

In the latter:

FIG. 1: shows a longitudinal sectional view through a preferred form of embodiment of an inventive coil carrier, FIG. 2a: shows a cross-sectional view through a first yoke element of the coil carrier as per FIG. 1, FIG. 2b: shows a magnified detail from FIG. 2a, from which it can be seen that plastic body material projects radially inwards beyond recesses in the yoke element that are open in the radially inwards direction, and forms a guiding surface for an axially adjustable armature on its outer surface.

FIG. 4 shows a longitudinal sectional view through an electromagnetic actuator.

In the figures the same elements, and elements with the same function, are identified with the same reference symbol.

DETAILED DESCRIPTION

Figure 3:
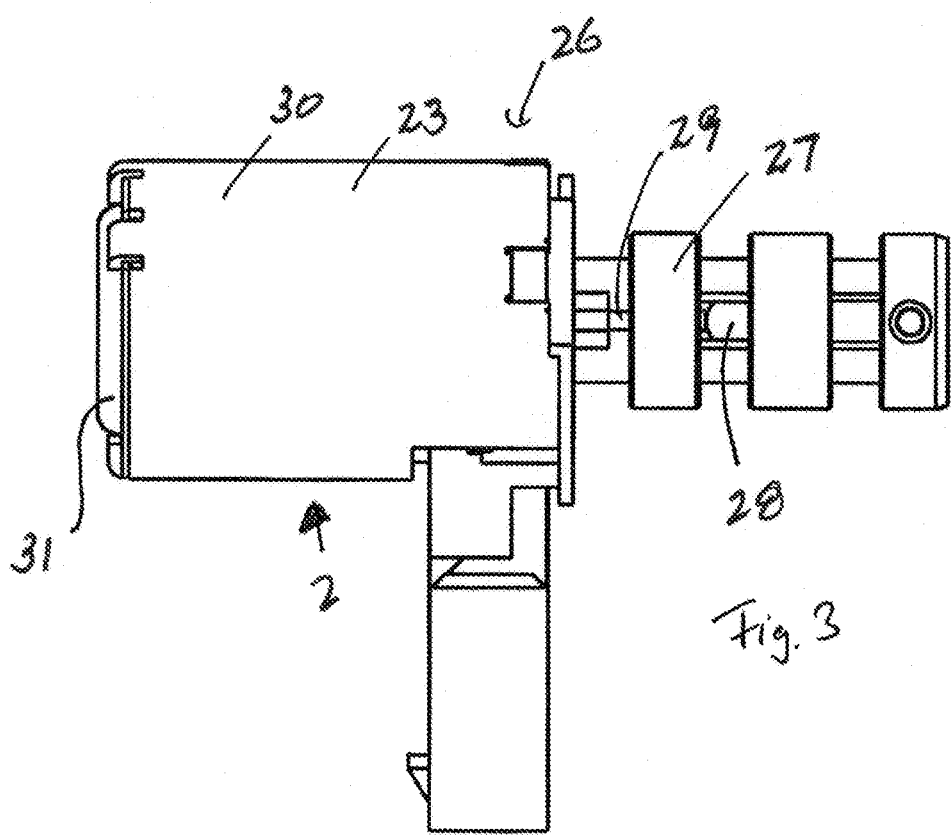
FIG. 3: shows a view of a valve arrangement with an electromagnetic actuator, featuring an inventive coil carrier arranged in the interior of a housing.

FIG. 1 shows a coil carrier 1 for an exemplary electromagnetic actuator 2 shown in FIGS. 3 and 4. The coil carrier features a winding section 3 for the accommodation of an energisable winding (coil), which is not represented, wherein the winding section 3 in the example of embodiment shown is formed on the outer periphery of an injection moulded plastic body 4. The plastic body 4 has a cylindrical outer surface 5, at least in the region of the winding section 3, on which the winding can be wound. In the plane of the drawing on the left-hand side the winding section 3 is bounded by a first annular supporting section 6, which extends in the radial direction beyond the above-cited outer surface 5. In the axially opposite direction the winding section 3 is bounded by a radial supporting wall 7 extending in the peripheral direction. In the wound state of the winding the first supporting section 6 and the supporting wall 7 accommodate the winding axially between them.

As ensues from FIG. 1, in the plane of the drawing on the left-hand side a first yoke disc 8 axially bounds the first supporting section 6; the yoke disc is overmoulded from the plastic material of the plastic body 4, i.e. it is affixed by means of an overmoulding process onto the plastic body 4. Here, in the example of embodiment shown, the first yoke disc 8 is axially accommodated between the first supporting section 6 and a second supporting section 9 forming an end face; together these bound a seating in the form of a groove for the first yoke disc 8. The yoke disc 8 has a greater thickness and therefore a greater axial extent than the first supporting section 6, as a result of which the first supporting section 6 is reinforced, i.e. supported, and any bending up during the winding process is reliably avoided.

From FIG. 1 it further ensues that the first yoke disc 8 is designed as an annular disc and bounds a central passage 10. In sections 11 spaced apart in the peripheral direction the first yoke disc 8 projects radially inwards as far as the passage 10 and thus bounds the latter directly.

Plastic body material is provided in regions in the peripheral direction between these sections 11; this material inwardly penetrates recesses in the first yoke disc 8 that are open in the radially inwards direction, which recesses will be explained later, and thus bounds the passage 10 in the peripheral direction between the sections 11, and in each case forms a guide 12 for an adjustable armature in an armature guide chamber 13 within the plastic body 4. The above-cited guides 12 continue in the form of bands in the armature guide chamber 13 that is axially adjacent to the region within the first yoke disc 8. Altogether the guides 12 take the form of linear protuberances, which altogether provide a guide for the armature that is segmented in the peripheral direction, i.e. a depression in the form of a groove is provided between each pair of guides in the peripheral direction.

As further ensues from FIG. 1, the armature guide chamber 13 is axially bounded by a core 14, which has a passage hole 15 for the accommodation of a plunger, which is not represented. A second yoke disc 16 fits axially on the core 14, on the axial face of the core 14 that faces away from the first yoke disc 8; the second yoke disc has the same radial extent as the first yoke disc. The second yoke disc 14 also has a central opening 17, through which passes an extended section 18 of the core 14. At a radial distance from the opening 17 a plurality of peripherally closed passages 19, spaced apart in the peripheral direction, are formed in the second yoke disc 16; these passages are penetrated by plastic body material during the injection moulding process. The plastic body material in the passages 19 integrally connects a first supporting disc section 20 on the face of the second yoke disc 16, which faces towards the first yoke disc 8, with a second supporting disc 21 on the axial face of the second yoke disc 16, which faces away from the first yoke disc 8. In FIG. 1 can further be discerned a central opening 22 in the second supporting disc 21; this is aligned with the passage hole 15 for the plunger in the core 14. Altogether it ensues from FIG. 1 that the second yoke disc 16 is axially secured by the two supporting disc sections 20, 21 of the plastic body 4.

In the assembled state the two yoke discs 8, 16 are connected in a magnetically conducting manner via a, preferably metallic, housing 23, which is represented in FIGS. 3 and 4.

FIG. 2a shows a cross-sectional view of the overmoulded first yoke disc 8 as per FIG. 1. Here a plurality of recesses 24 (passages) can be discerned, arranged at a radial distance from the outer periphery; these are open in the radially inwards direction, i.e. towards the passage 10. The recesses 24 are evenly spaced apart in the peripheral direction and have a circular contour in a radially outer region, which tapers radially inwards. Thus altogether a kind of drop shape is obtained in cross-section. The recesses 24 that are open in the radially inwards direction are filled with plastic body material; this projects in the radially inwards direction beyond the first yoke disc 8 and in each case forms a guide 12 on the inner circumference of the passage 10 with a concave curved guiding surface 25 for the armature. The plastic body material in the recesses 4 integrally connects with one another the two supporting sections 6, 9 on the two axial faces of the first yoke disc 8.

From FIG. 2b it ensues that in regions in the peripheral direction between two guides 12 the first yoke disc 8 directly bounds the passage 10, in particular in the sections identified with the reference symbol 11.

From FIG. 3 it can be discerned that in a valve arrangement 26 featuring an electromagnetic actuator, a guiding section 27 of plastic having a peripheral groove connects with the metal housing 23; in this guiding section is accommodated what is here a spherical valve element 28; by means of a plunger 29 interacting with the armature, not represented; this valve element can be adjusted between different switching positions. The valve arrangement preferably takes the form of a 3/2-way valve arrangement.

From FIG. 3 it ensues, in particular, that an axial cover is connected with a sleeve section 30 of the metallic housing enclosing on its periphery the coil carrier; in particular it is connected by the bending over of appropriate connecting tabs. The cover 31 can directly or indirectly (in the case of the additional provision of a component axially adjacent to the cover 31) form a stop for the armature in the armature guide chamber. The sleeve section 30 serves to close the magnetic circuit between the two yoke discs shown, for example, in FIG. 1.

FIG. 4 shows a scrap section of the electromagnetic actuator 2 as per FIG. 3. For graphic reasons the core 14 and the second yoke disc 16 are designed as a single component; this can also be implemented theoretically. Likewise purely for graphic reasons the actual electromagnetic winding is not represented independently of the plastic body 4.

It can be discerned that an armature 32 in the form of a bolt or cylinder is adjustably arranged in the armature guide chamber 13; the armature can be moved by energisation of the winding, which is not separately represented. In the interests of clarity the plunger, which can be actuated by means of the armature 32, or which can be integrally designed with the armature 32, is not represented.

In particular it ensues from FIG. 4 that the sleeve section 30 of the metallic housing 23 extends between the two yoke discs 8, 16, and thus connects these with one another in a magnetically conducting manner. The cover 31 is supported on the first yoke disc 8 in a radially outer region; however, this is not necessary for affixing reasons, since the first yoke disc 8 is affixed, i.e. held, directly by means of overmoulding.

The invention claimed is:

1. A coil carrier for an electromagnetic actuator (2), with a winding section (3) for the accommodation of an energisable winding, with an injection moulded plastic body (4), with a first yoke disc (8) designed as an annular disc and affixed on a first axial face of the winding section (3), and with an armature guide chamber enclosed by the plastic body (4) for the accommodation of an axially adjustable armature (32), wherein a second yoke disc (16) is provided on an axial face of the winding section (3) that is located opposite to the first axial face, wherein the first yoke disc (8) has at least one recess (24) that is open in the radially inwards direction, and wherein the first yoke disc (8) is affixed to the plastic body (4) by means of overmoulding, such that plastic body material projects radially inwards beyond the recess (24) and forms a guide (12) for the armature (32), and wherein the second yoke disc (16) is affixed to the plastic body (4) by means of overmoulding.

2. The coil carrier in accordance with claim 1, wherein a plurality of recesses (24) spaced apart in the peripheral direction are provided in the first yoke disc (8), and wherein in each case the plastic body material projects beyond the recesses (24) in the radially inwards direction, and in each case forms a guide (12) for the armature (32).

3. The coil carrier in accordance with claim 1, wherein an axial supporting section of the coil body projects radially outwards beyond the inner periphery of the first yoke disc (8) on both axial faces of the first yoke disc (8), and wherein the two supporting sections (6, 9) are materially bonded with one another via the plastic body material in the at least one recess (24) in the first yoke disc (8).

4. The coil carrier in accordance with claim 3, wherein the first yoke disc (8) bounds the inner periphery of the armature guide chamber between at least two of the guides (12) in the peripheral direction.

5. The coil carrier in accordance with claim 1, wherein the at least one guide (12) projects radially inwards beyond the first yoke disc (8) by a distance from a range of values between 0.01 mm and 0.1 mm.

6. The coil carrier in accordance with claim 1, wherein the at least one guide (12) axially continues the inner periphery wall of the armature guide chamber.

7. The coil carrier in accordance with claim 1, wherein the at least one guide (12) has a concave curved guiding surface to provide the sliding facility for the armature (32).

8. The coil carrier in accordance with claim 1, wherein the first and/or the second yoke disc (8, 16) are/is designed in one piece.

9. The coil carrier in accordance with claim 1, wherein a core (14), axially bounding the armature guide chamber, preferably adjacent to the second yoke disc (16) and/or axially passing through the latter, is overmoulded by the plastic body (4).

10. The coil carrier in accordance with claim 9, wherein the core (14) has an axial passage for purposes of accommodating a plunger (29) adjustable by means of the armature (32).

11. The coil carrier in accordance with claim 1, wherein the coil carrier (1) has an axial extent from a range of values between 5 mm and 35 mm and/or an internal diameter of the armature guide chamber from a range of values between 5 mm and 20 mm.

12. The coil carrier in accordance with claim 1, wherein an energisable winding is wound about the winding section (3).

13. An electromagnetic actuator with a coil carrier (1) carrying an energisable winding in accordance with claim 1, wherein in whose armature guide chamber is accommodated an adjustable armature (32), which is guided on the at least one guide (12).

14. The coil carrier in accordance with claim 2, wherein the plurality of recesses (24) are spaced apart evenly in the peripheral direction.

15. The coil carrier in accordance with claim 3, wherein the axial supporting section of the coil body is peripherally closed.

16. The coil carrier in accordance with claim 7, wherein the curved guiding surface is a cylindrical guiding surface.

17. The coil carrier in accordance with claim 1, wherein the wherein the coil carrier (1) has an axial extent from a range of values between 15 mm and 25 mm, and/or an internal diameter of the armature guide chamber from a range of values between 5 mm and 10 mm.

* * * * *